US012440876B2

(12) United States Patent
Hietbrink et al.

(10) Patent No.: US 12,440,876 B2
(45) Date of Patent: Oct. 14, 2025

(54) ANTI-FOULING UNIT AND METHOD OF APPLYING A PLURALITY OF ANTI-FOULING UNITS TO A SURFACE

(71) Applicant: KONINKLIJKE PHILIPS N.V., Eindhoven (NL)

(72) Inventors: Roelant Boudewijn Hietbrink, Utrecht (NL); Bart Andre Salters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 297 days.

(21) Appl. No.: 18/027,942

(22) PCT Filed: Sep. 23, 2021

(86) PCT No.: PCT/EP2021/076134
§ 371 (c)(1),
(2) Date: Mar. 23, 2023

(87) PCT Pub. No.: WO2022/069326
PCT Pub. Date: Apr. 7, 2022

(65) Prior Publication Data
US 2023/0364659 A1 Nov. 16, 2023

(30) Foreign Application Priority Data
Oct. 2, 2020 (EP) .................................... 20199835
Oct. 2, 2020 (EP) .................................... 20199843

(51) Int. Cl.
*B08B 17/02* (2006.01)

(52) U.S. Cl.
CPC .................................... *B08B 17/02* (2013.01)

(58) Field of Classification Search
CPC ...................................................... B08B 17/02
See application file for complete search history.

(56) References Cited

U.S. PATENT DOCUMENTS

2020/0010160 A1* 1/2020 Van Delden ......... H04B 1/1607
2020/0148318 A1 5/2020 Salters et al.
2023/0364659 A1 11/2023 Hietbrink

FOREIGN PATENT DOCUMENTS

EP 3438520 A1 2/2019
EP 4221907 A1 8/2023
(Continued)

OTHER PUBLICATIONS

International Search Report and Written Opinion from PCT/EP2021/076134 mailed Dec. 17, 2021.

*Primary Examiner* — Sean M Luck

(57) ABSTRACT

An anti-fouling unit (1) is configured to be arranged on a surface and comprises at least one electric circuit (30) including a light-emitting arrangement (31) configured to emit anti-fouling light. Further, the anti-fouling unit (1) comprises a carrier slab (40) carrying the at least one electric circuit (30), which carrier slab (40) includes at least one active slab zone (42) where the at least one electric circuit (30) is located and at least one passive slab zone (43) outside the active slab zone (42) that is configured to allow a division of the anti-fouling unit (1) in separate pieces without deteriorating the anti-fouling functionality, and the light-emitting arrangement (31) of the at least one electric circuit (30) is configured to realize the anti-fouling functionality both at a position of the at least one active slab zone (42) and at a position of the at least one passive slab zone (43).

15 Claims, 7 Drawing Sheets

(56) References Cited

FOREIGN PATENT DOCUMENTS

| | | | |
|---|---|---|---|
| WO | 2014188347 | A1 | 11/2014 |
| WO | 2020058333 | A1 | 3/2020 |

* cited by examiner

ANTI-FOULING UNIT AND METHOD OF APPLYING A PLURALITY OF ANTI-FOULING UNITS TO A SURFACE

CROSS REFERENCE TO RELATED APPLICATIONS

This application is a U.S. national phase application of International Application No. PCT/EP2021/076134 filed on Sep. 23, 2021, which claims the benefit of EP Application Serial No. 20199835.8 filed on Oct. 2, 2020 and EP Application Serial No. 20199843.2 filed Oct. 2, 2020 and are incorporated herein by reference.

FIELD OF THE INVENTION

In the first place, the invention relates to an anti-fouling unit configured to be arranged on a surface, wherein the anti-fouling unit comprises at least one electric circuit including a light-emitting arrangement configured to emit anti-fouling light, and a plate-shaped carrier slab carrying the at least one electric circuit, and wherein the carrier slab has an emission surface configured to allow light from the light-emitting arrangement of the at least one electric circuit to pass to outside of the anti-fouling unit and to thereby subject an exterior side of the emission surface and surroundings thereof to an anti-fouling action.

In the second place, the invention relates to an assembly of an object and a plurality of anti-fouling units as mentioned arranged on a surface of the object.

In the third place, the invention relates to a method of preparing an anti-fouling unit as mentioned for at least partial arrangement thereof on a surface.

In the fourth place, the invention relates to a method of applying a plurality of anti-fouling units as mentioned to a surface.

BACKGROUND OF THE INVENTION

In general, the invention is in the field of anti-fouling of surfaces. Fouling of surfaces that are exposed to water, during at least a part of their lifetime, is a well-known phenomenon that causes substantial problems in many fields. For example, in the field of shipping, biofouling on the hull of ships is known to cause a severe increase in drag of the ships, and thus increased fuel consumption of the ships. In this respect, it is estimated that an increase of up to 40% in fuel consumption can be attributed to biofouling.

In general, biofouling is the accumulation of microorganisms, plants, algae, small animals and the like on surfaces. According to some estimates, over 1,800 species comprising over 4,000 organisms are responsible for biofouling Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

Biofouling can cause machinery to stop working and water inlets to get clogged, to mention only two other negative consequences than the above-mentioned increase of drag of ships. In any case, the topic of anti-biofouling, i.e. the process of removing and/or preventing biofouling, is well-known.

WO 2020/058333 A1 is in the field of anti-biofouling of marine objects and discloses a light emitting unit that is configured to be applied to a surface area of a marine object and that comprises at least one light source configured to emit anti-fouling light.

US 2020/148318 A1 discloses an anti-fouling lighting system configured for preventing or reducing biofouling on a fouling surface of an object, by providing an anti-fouling light via an optical medium to said fouling surface, the anti-fouling lighting system comprising a lighting module comprising a light source configured to generate an anti-fouling light.

EP 3 438 520 A1 discloses a light emitting device that can be used in various contexts, including the context of realizing an anti-fouling action on surfaces. The light emitting device comprises light emitting units being arranged in a plane filling pattern for covering at least a substantial portion of a surface.

WO 2014/188347 A1 discloses a method of anti-fouling of a surface while said surface is at least partially submersed in a liquid environment, in particular an aqueous or oily environment. The method involves providing an anti-fouling light and providing an optical medium in close proximity to such a protected surface, the optical medium having a substantially flat emission surface. At least part of the light is distributed through the optical medium in a direction substantially parallel to the protected surface, and the anti-fouling light is emitted from the emission surface of the optical medium, in a direction away from the protected surface. The anti-fouling light may be ultraviolet light, and the optical medium may comprise ultraviolet transparent silicone, i.e. silicone that is substantially transparent to ultraviolet light, and/or ultraviolet grade fused silica, in particular quartz.

By applying the method known from WO 2014/188347 A1, it is possible to cover a protected surface to be kept clean from biofouling, at least to a significant extent, with a layer that emits germicidal light. The protected surface can be the hull of a ship, as mentioned earlier, but the method is equally applicable to other types of surface.

WO 2014/188347 A1 further discloses a lighting module that is suitable to be used for putting the above-mentioned method to practice. Thus, the lighting module comprises at least one light source for generating anti-fouling light and an optical medium for distributing the anti-fouling light from the light source. The at least one light source and/or the optical medium may be at least partially arranged in, on and/or near the protected surface so as to emit the anti-fouling light in a direction away from the protected surface.

The lighting module known from WO 2014/188347 A1 may be provided as a foil that is suitable for application to the protected surface. The foil may be substantially size-limited in two orthogonal directions perpendicular to a thickness direction of the foil, so as to provide a tile-shaped anti-fouling unit; in another embodiment, the foil is substantially size-limited in only one direction perpendicular to the thickness direction of the foil, so as to provide an elongated strip of anti-fouling foil.

The concept of having tile-shaped anti-fouling units is particularly interesting when it comes to subjecting large surfaces to an anti-fouling action, which may be surfaces being as large as up to more than 10,000 $m^2$. It may especially be envisaged to arrange the anti-fouling units in a plane filling pattern for covering at least a substantial part of a surface. Anti-fouling units can be of any suitable shape and size. For example, square units may be used and arranged in a regular pattern on a ship's hull for forming an anti-fouling light emitting device on the hull, wherein each unit may be dimensioned so as to cover about 1 $m^2$ of the hull. In any case, the anti-fouling units are configured to be arranged on a surface, which surface may be referred to as a/the protected surface.

As indicated in the foregoing, the invention relates to an anti-fouling unit comprising i) at least one electric circuit including a light-emitting arrangement configured to emit anti-fouling light, and ii) a plate-shaped carrier slab carrying the at least one electric circuit, wherein the carrier slab has an emission surface configured to allow light from the light-emitting arrangement of the at least one electric circuit to pass to outside of the anti-fouling unit and to thereby subject an exterior side of the emission surface and surroundings thereof to an anti-fouling action. It is not so much of an issue to cover flat surface portions with a number of such anti-fouling units, but covering non-flat curved surface portions and surface portions where irregularities such as welding seams, markings and interruptions of the surface are present constitutes quite a challenge.

SUMMARY OF THE INVENTION

It is an object of the invention to provide a way of reliably covering any portion of a surface with at least one anti-fouling unit, even if the surface portion is curved and/or is a surface portion where an irregularity is present. In view thereof, the invention provides an anti-fouling unit configured to be arranged on a surface, wherein the anti-fouling unit comprises at least one electric circuit including a light-emitting arrangement configured to emit anti-fouling light, and a plate-shaped carrier slab carrying the at least one electric circuit, wherein the carrier slab has an emission surface configured to allow light from the light-emitting arrangement of the at least one electric circuit to pass to outside of the anti-fouling unit and to thereby subject an exterior side of the emission surface and surroundings thereof to an anti-fouling action, wherein the carrier slab includes at least one active slab zone where the at least one electric circuit is located and at least one passive slab zone outside the active slab zone, which at least one passive slab zone is configured to allow a division of the anti-fouling unit in separate pieces in order to fit on a predetermined surface portion while keeping the functionality of the at least one electric circuit intact, and wherein the light-emitting arrangement of the at least one electric circuit is configured to subject the exterior side of the emission surface and surroundings thereof to an anti-fouling action both at a position of the at least one active slab zone and at a position of the at least one passive slab zone.

The invention also relates to an assembly of an object and a plurality of anti-fouling units as defined in the preceding paragraph arranged on a surface of the object. The object may be a marine object, in which case the term "marine object" should be understood such as to refer to an object comprising at least one surface that is intended to be at least partially submersed in a fouling liquid containing biofouling organisms during at least a part of the lifetime of the object. In the context of the present text, the term "marine object" is not limited to objects for use in salt water, but is to be understood so as to include objects for use in fresh water as well. Examples of marine objects include ships and other vessels, marine stations, sea-based oil or gas installations, buoyancy devices, support structures for wind turbines at sea, structures for harvesting wave/tidal energy, sea chests, underwater tools, etc.

According to the invention, difficulties encountered in covering non-flat and/or non-smooth portions of protected surfaces with one or more anti-fouling units are alleviated when adjustments are made to the design of the anti-fouling unit, especially when the anti-fouling unit is designed such that the carrier slab of the anti-fouling unit includes at least one active slab zone where the at least one electric circuit of the anti-fouling unit is located and at least one passive slab zone outside the active slab zone, with the at least one passive slab zone being configured to allow a division of the anti-fouling unit in separate pieces while keeping the functionality of the at least one electric circuit intact. Further, the light-emitting arrangement included in the at least one electric circuit is configured to subject the exterior side of the emission surface of the carrier slab and surroundings of the emission surface to an anti-fouling action both at a position of the at least one active slab zone and at a position of the at least one passive slab zone, so that the entirety of the anti-fouling unit is under the anti-fouling influence of the light-emitting arrangement of the at least one electric circuit.

On the basis of the design of the anti-fouling unit with the at least one active slab zone and the at least one passive slab zone, a possibility of dividing the anti-fouling unit in separate pieces while keeping the functionality of the at least one electric circuit intact is obtained. Hence, when an anti-fouling unit needs to be fitted on a non-flat and/or non-smooth surface portion, this can be done by dividing the anti-fouling unit in two or more separate pieces in an appropriate way, and by arranging at least one separate piece thus obtained on the surface at the position of the respective portion, preferably at least one separate piece including at least one active slab zone so as to have the anti-fouling functionality on the surface, as desired.

The distribution of the at least one active slab zone and the at least one passive slab zone in the carrier slab may be chosen freely in the framework of the invention. For example, it may be practical if the at least one passive slab zone extends along a part of the periphery of the carrier slab or along the entire periphery of the carrier slab. In such a case, it is advantageous if a width of the at least one passive slab zone between the at least one active slab zone and the periphery of the carrier slab is smaller than or equal to 10 cm or probably 9 cm, as in this way, complete anti-fouling coverage of the at least one passive slab zone can be ensured considering the light absorption features of currently known feasible materials of the carrier slab. On the other hand, in such a case, it is advantageous if the width of the at least one passive slab zone between the at least one active slab zone and the periphery of the carrier slab is larger than 7 cm or even 8 cm so as to have large flexibility when it comes to adapting the size of the carrier slab so as to enable fitting the carrier slab on a given surface portion.

According to a practical possibility, the anti-fouling unit may comprise two electric circuits of the type including at least one light-emitting arrangement. In such a case, it is further practical if the anti-fouling unit comprises a passive slab zone extending between an active slab zone where the one electric circuit is located and another active slab zone where the other electric circuit is located, as this allows for easy division of the anti-fouling unit in two separate pieces including an active slab zone. In view of the foregoing remark in respect of ensuring complete anti-fouling coverage of the at least one passive slab zone assuming application of currently known anti-fouling light sources such as ultraviolet LEDs, it is advantageous if a width of the passive slab zone between the active slab zone where the one electric circuit is located and the other active slab zone where the other electric circuit is located is smaller than or equal to 20 cm or probably 18 cm. In order to have optimal flexibility of use of the anti-fouling unit, an embodiment of the anti-fouling unit is feasible in which the active slab zone where the one electric circuit is located and the other active slab zone where the other electric circuit is located are of different size.

The size of the at least one passive slab zone in the emission surface as compared to the size of the at least one active slab zone in the emission surface may be different in respect of different embodiments of the anti-fouling unit according to the invention. In this respect, it is noted that the invention covers all of the following options: i) an option of the size of the at least one passive slab zone in the emission surface being smaller than the size of the at least one active slab zone in the emission surface, ii) an option of the size of the at least one passive slab zone in the emission surface being the same as the size of the at least one active slab zone in the emission surface, and iii) an option of the size of the at least one passive slab zone in the emission surface being larger than the size of the at least one active slab zone in the emission surface. A suitable range of a ratio of the size of the at least one passive slab zone in the emission surface to the size of the at least one active slab zone in the emission surface is 0.1 to 10.

In the framework of the invention, various advantageous options exist in respect of the shape of the periphery of the carrier slab. The periphery of the carrier slab may be of trapezoidal shape, or of hexagonal shape, for example.

It is practical if the at least one electric circuit includes a power-receiving arrangement configured to receive power from outside of the anti-fouling unit to be used for powering the light-emitting arrangement, besides the light-emitting arrangement. Among other things, it is possible that the power-receiving arrangement comprises at least two electric coils configured to function independently from each other, so that a situation in which only a single predetermined possibility exists in respect of a functional position of the at least the active slab zone of the anti-fouling unit relative to an external power-supplying arrangement is avoided. In such a case, it may be practical if the at least two electric coils are located at rotation symmetrical positions in the carrier slab. For example, if the shape of the periphery of the carrier slab is rectangular, two electric coils may be located such that the coils are at the same location for half turns of the carrier slab on a surface, i.e. turns of the carrier slab over 180°. On the other hand, if the shape of the periphery of the carrier slab is rectangular, it may be handy if one electric coil is located along the short side of the carrier slab and if another electric coil is located along the long side of the carrier slab, so that the anti-fouling unit can be arranged in one of two different positions relative to an external power-supplying arrangement, the different positions being associated with a turn of the carrier slab over 90°. Further, it is possible to have an electric coil at each of the sides of a rectangular carrier slab or a carrier slab of another shape including a number of more or less straight sides.

For the same purpose of preventing positioning of the anti-fouling unit relative to an external power-supplying arrangement to be restricted to only one possibility, in a case that the anti-fouling unit comprises a single electric circuit includes a power-receiving arrangement, it may be practical if the power-receiving arrangement comprises an electric coil that is centrally arranged in the carrier slab. In this respect, it is to be noted that it may be advantageous if the electric coil is ring-shaped and the center of gravity of the carrier slab is in an area surrounded by the electric coil.

In respect of the carrier slab it is to be noted that an example of an appropriate material of the carrier slab is silicone. Further, a configuration is possible in which the at least one electric circuit is embedded in the material of the carrier slab. In respect of the light-emitting arrangement it is to be noted that the light-emitting arrangement may include at least one LED, for example. In respect of the anti-fouling light it is to be noted that the invention covers the use of any suitable type of anti-fouling light, including the use of ultraviolet light.

The invention also relates to a method of preparing an anti-fouling unit as defined in the foregoing for at least partial arrangement thereof on a surface. Such a method involves dividing the anti-fouling unit in separate pieces at the position of at least one passive slab zone while keeping the functionality of the at least one electric circuit intact. It is particularly advantageous if a shape of one of the separate pieces of the anti-fouling unit is realized in compliance with a surface portion of predetermined outline and associated space on the surface to be occupied by the one of the separate pieces. A practical way of dividing the anti-fouling unit in separate pieces involves subjecting the anti-fouling unit to a cutting action at the position of the at least one passive slab zone, wherein any suitable cutting tool may be utilized. In terms of the anti-fouling unit according to the invention, this implies that it is practical if the at least one passive slab zone is configured to allow a division of the anti-fouling unit in separate pieces by means of a cutting action.

The invention also relates to a method of applying a plurality of anti-fouling units as defined in the foregoing to a surface. Such a method involves arranging the anti-fouling units on the surface in a plane filling pattern, and dividing at least a number of the anti-fouling units in separate pieces at the position of at least one passive slab zone while keeping the functionality of the at least one electric circuit intact. In the process, it may be so that the anti-fouling units are positioned on the surface alongside each other in a closely adjoining fashion. According to a practical possibility, in conformity with aspects of the invention already described in the foregoing, the method of applying the plurality of anti-fouling units to a surface may involve realizing a shape of one of the separate pieces of each of the anti-fouling units which are divided in separate pieces in compliance with a surface portion of predetermined outline and associated space on the surface to be occupied by the one of the separate pieces. Also in conformity with aspects of the invention already described in the foregoing, it is practical if each of the anti-fouling units which are divided in separate pieces is subjected to a cutting action at the position of the at least one passive slab zone.

For the sake of completeness, it is noted that the term "plane filling pattern" should be understood in a practical sense, i.e. so as to cover various options which would normally be denoted by a skilled person by means of the term, including the above-mentioned option according to which anti-fouling units are arranged on the surface in a closely adjoining fashion, with practically no space between the anti-fouling units, and an option according to which anti-fouling units are arranged beside each other with only a narrow space between them. In general, the term is applicable to both a pattern in which the anti-fouling units are arranged so as to form a continuous cover of a surface and a pattern in which the anti-fouling units are arranged so as to form a cover of a surface that is provided with interruptions, the interruptions being no more than small areas between the anti-fouling units, wherein the larger part of the total area of the pattern is occupied by the anti-fouling units. In any case, it may particularly be so that mutual distances between anti-fouling units are significantly smaller than general dimensions of the anti-fouling units.

According to a practical possibility, dividing at least a number of the anti-fouling units in separate pieces involves actions of positioning two of the anti-fouling units relative to each other with passive slab zones of the respective anti-fouling units in an overlapping arrangement and making a single cut through the overlapping passive slab zones. In that way, an accurate way of realizing a configuration in which the one anti-fouling unit closely adjoins the other is obtained without a need for taking complex measures, as it is just a matter of putting the anti-fouling units in the appropriate positioning relative to each other, with passive slab zones of the anti-fouling units in an overlapping arrangement while remainders of the anti-fouling units extend at different sides of the area where the overlapping passive slab zones are present, which may be more or less opposite sides of that area, and making a single cut through the conjoined passive slab zones, after which shapes of edges of the anti-fouling units thus obtained are exactly adapted to each other so that those edges can immediately assume a closely adjoining arrangement.

The above-described and other aspects of the invention will be apparent from and elucidated with reference to the following detailed description of practical embodiments of an anti-fouling unit that is configured to be arranged on a surface and practical ways of handling the anti-fouling unit.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
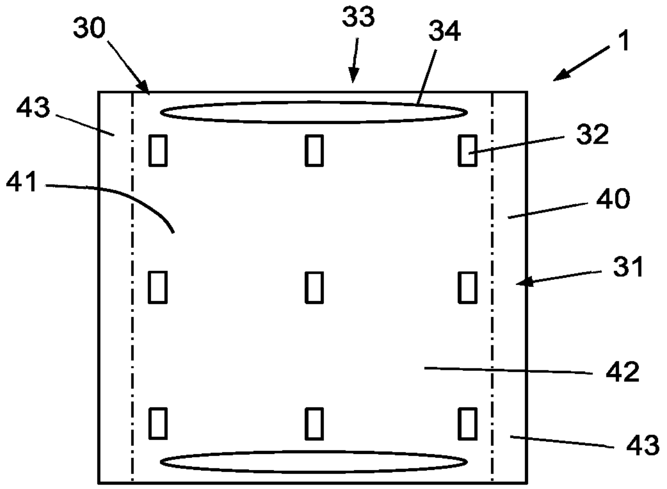
FIG. 1 diagrammatically shows an anti-fouling unit according to a first practical embodiment of the invention, FIG. 2 diagrammatically shows a number of anti-fouling units according to a second practical embodiment of the invention and illustrates how the anti-fouling units can be used for covering a conical surface.

FIG. 1 diagrammatically shows an anti-fouling unit 1 according to a first practical embodiment of the invention. The anti-fouling unit 1 is configured to be arranged on a surface 20 and is operable to perform an anti-fouling action by emitting anti-fouling light. An example of a surface 20 is diagrammatically shown in FIG. 2. The surface 20 may be an exterior surface of a marine object, for example. The surface 20 shown in FIG. 2 is of conical shape and is just one example of numerous types of surface on which at least one anti-fouling unit according to the invention might be arranged.

In general, the anti-fouling unit according to the invention comprises at least one electric circuit 30 including a light-emitting arrangement 31 configured to emit the anti-fouling light, and a plate-shaped carrier slab 40 carrying the at least one electric circuit 30. In this respect, it may be practical if the at least one electric circuit 30 is embedded in the material of the carrier slab 40. The carrier slab 40 has an emission surface 41 configured to allow light from the light-emitting arrangement 31 of the at least one electric circuit 30 to pass to outside of the anti-fouling unit and to thereby subject an exterior side of the emission surface 41 and surrounding thereof to an anti-fouling action. For the sake of completeness, it is noted that when the anti-fouling unit is arranged on a surface 20, the anti-fouling unit contacts the surface 20 through another surface of the carrier slab 40 than the emission surface 41. For the purpose of enabling the anti-fouling unit to follow the shape of a non-flat portion of a surface 20, it is practical if the material of the carrier slab 40 is flexible. Further, it is practical if the material of the carrier slab 40 is transparent to the anti-fouling light, which may be ultraviolet light, for example, wherein the carrier slab 40 may be configured to distribute the anti-fouling light.

Figure 5:
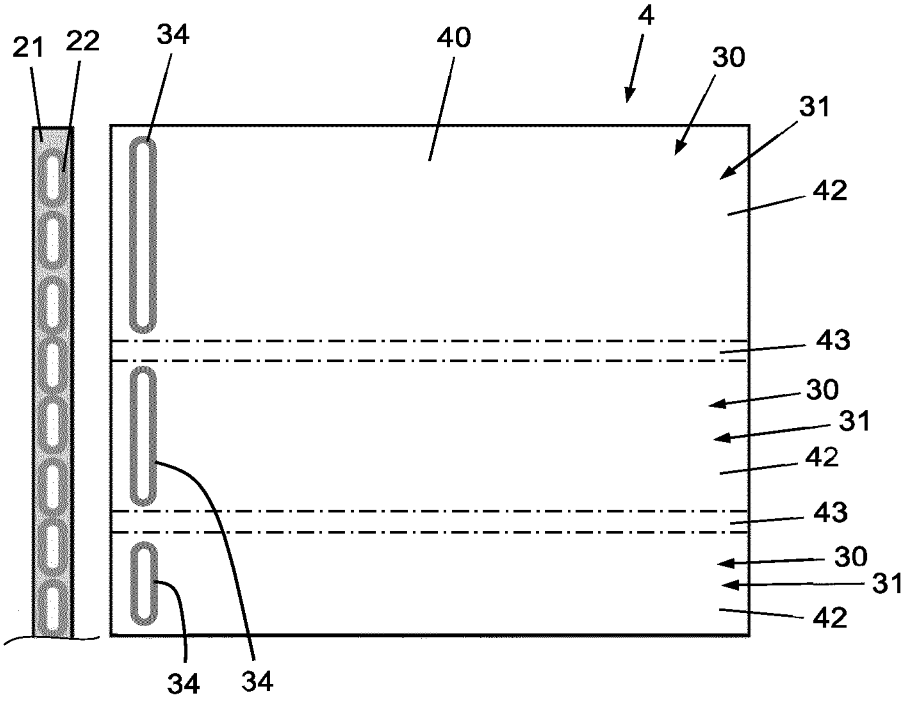
Figure 6:
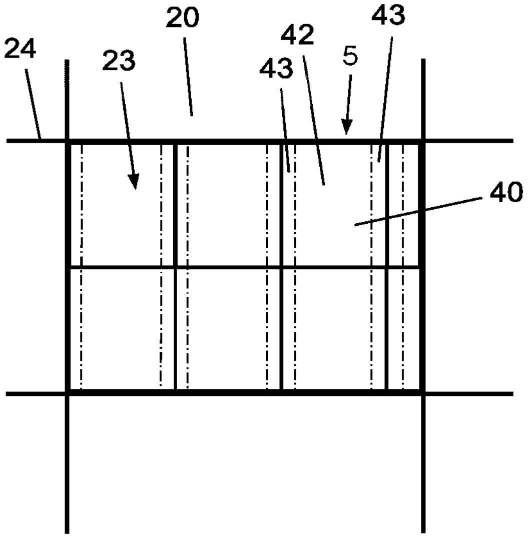
FIGS. 6 and 7 illustrate how a number of anti-fouling units according to a fifth practical embodiment of the invention can be used for covering a surface portion that is located between welding seams on the surface.
Figure 8:
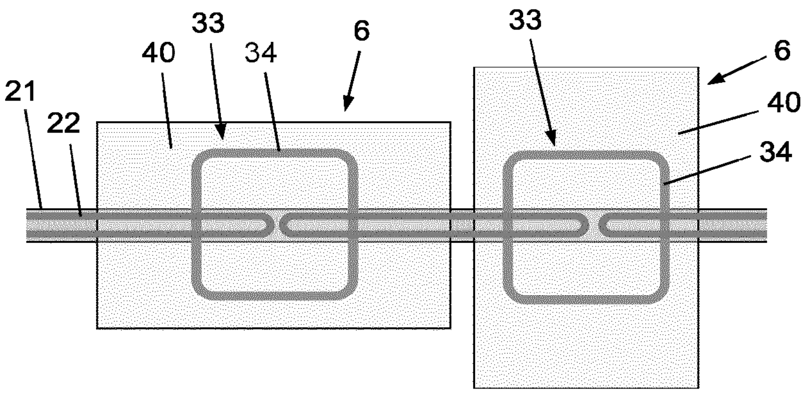
FIG. 8 illustrates two different ways in which an anti-fouling unit according to a sixth practical embodiment of the invention can be positioned relative to a power-supplying strip.

The carrier slab 40 of the anti-fouling unit 1 according to the first practical embodiment of the invention has a square periphery. Besides the surface 20, FIG. 2 diagrammatically shows a number of anti-fouling units 2 according to a second practical embodiment of the invention. The carrier slab 40 of the anti-fouling unit 2 according to the second practical embodiment of the invention has a trapezoidal periphery. In general, numerous shapes of the periphery of the carrier slab 40 are possible in the framework of the invention. A square shape of the periphery of the carrier slab 40 can also be seen in FIGS. 12 and 13, which relate to an anti-fouling unit 9 according to a ninth practical embodiment of the invention and an anti-fouling unit 10 according to a tenth practical embodiment of the invention, respectively. A trapezoidal shape of the periphery of the carrier slab 40 can also be seen in FIGS. 9 and 10, which relate to an anti-fouling unit 7 according to a seventh practical embodiment of the invention, and FIG. 11, which relates to an anti-fouling unit 8 according to an eighth practical embodiment of the invention. Other examples of the shape of the periphery of the carrier slab 40 include a hexagonal shape as can be seen in FIGS. 4, 14 and 15, which relate to an anti-fouling unit 3 according to a third practical embodiment of the invention, an anti-fouling unit 11 according to an eleventh practical embodiment of the invention and an anti-fouling unit 12 according to a twelfth practical embodiment of the invention, respectively, and a rectangular shape as can be seen in FIGS. 5, 6 and 8, which relate to an anti-fouling unit 4 according to a fourth practical embodiment of the invention, an anti-fouling unit 5 according to a fifth practical embodiment of the invention and an anti-fouling unit 6 according to a sixth practical embodiment of the invention, respectively.

Figure 2:
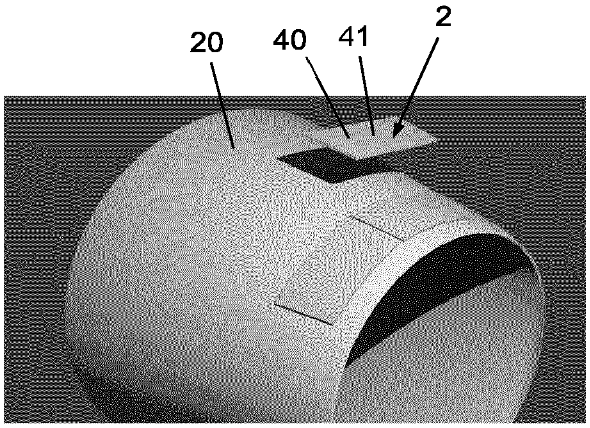
Figure 3:
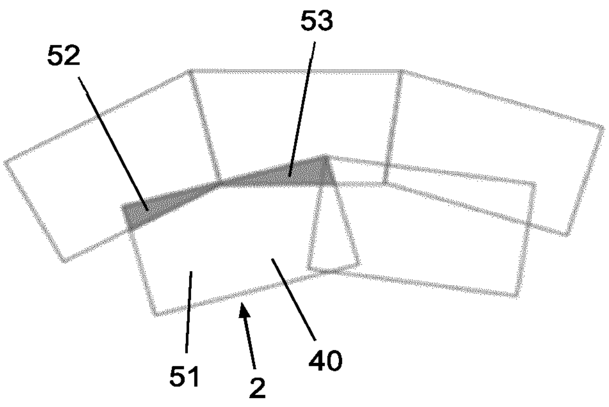
FIG. 3 illustrates a pattern of the anti-fouling units according to the second practical embodiment of the invention and how the anti-fouling units can be divided in separate pieces, FIG. 4 diagrammatically shows a number of anti-fouling units according to a third practical embodiment of the invention and illustrates how the anti-fouling units can be used for covering a spherical surface, FIG. 5 diagrammatically shows an anti-fouling unit according to a fourth practical embodiment of the invention and a part of a power-supplying strip.

With reference to FIGS. 2 and 3, it is noted that when it is intended to cover a non-flat surface 20 with anti-fouling units in a plane filling pattern while avoiding overlap of the carrier slabs 40 of the respective anti-fouling units, difficulties are encountered. Due to the shape of the surface 20, the anti-fouling units cannot be fitted together well. According to the invention, in order to alleviate this problem, the anti-fouling unit is designed such that the carrier slab 40 includes at least one active slab zone 42 where the at least one electric circuit 30 is located and at least one passive slab zone 43 outside the active slab zone 42. On the basis of the presence of the at least one passive slab zone 43, a possibility of dividing the anti-fouling unit in separate pieces while keeping the functionality of the at least one electric circuit 30 intact is obtained. The fact is that the anti-fouling unit can be subjected to a cutting action or the like at the position of a passive slab zone 43, and that the at least one electric circuit 30 is not touched in the process in view of the fact that the electric circuit 30 is present in the anti-fouling unit at a position outside of the passive slab zone 43. Advantageously, the process of dividing the anti-fouling unit in separate pieces is done in such a way that at least one piece is obtained that fits on a predetermined portion of the surface 20 to be covered, which may particularly be a portion of predetermined outline and associated space on the surface 20 delimited by adjacent anti-fouling units or pieces thereof. The piece is preferably a piece including at least one active slab zone 42, which does not alter the fact that it is also possible that a piece including only material of a former passive slab zone 43 of the anti-fouling unit is used if so desired, which may be the case when a relatively small and/or narrow surface portion needs to be covered, for example.

FIG. 3 shows an example of how an anti-fouling unit can be divided in three pieces 51, 52, 53 in order to fit on a predetermined surface portion. The two pieces 52, 53 indicated in dark color are not intended to be used on the surface 20 and to be separated from each other and the larger remaining piece 51, wherein this can be done without any problems assuming that the two pieces 52, 53 are in a passive slab zone 43. It is practical if the at least one passive slab zone 43 extends along at least a part of the periphery of the carrier slab 40, so that it is possible to shape/cut a large remaining piece 51 to measure by removing one or more peripheral pieces 52, 53 from the carrier slab 40.

Figure 4:
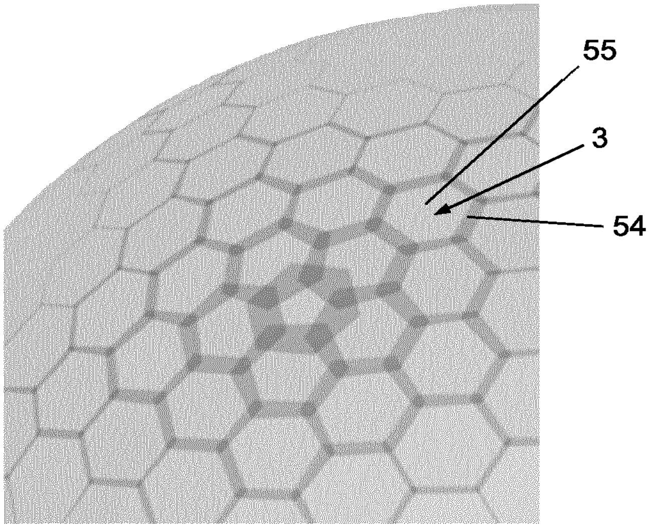

FIG. 4 illustrates how in a case of using anti-fouling units 3 of which the periphery of the carrier slab 40 is of hexagonal shape on a spherical surface 20, it may be advantageous to remove a loop-shaped peripheral piece 54 from a larger and central remaining piece 55 in at least some of the anti-fouling units 3 in order to obtain coverage of the surface 20 with the anti-fouling units 3 in a plane filling pattern. It is to be noted that this can be done without any harm to the light-emitting functionality of the anti-fouling units 3 if the carrier slab 40 of the anti-fouling units 3 includes a passive slab zone 43 extending along the periphery of the carrier slab 40.

According to the invention, in order to have full anti-fouling coverage of the anti-fouling unit, particularly when there is no need to divide the anti-fouling unit in pieces, the light-emitting arrangement 31 of the at least one electric circuit 30 of the anti-fouling unit is configured to subject the exterior side of the emission surface 41 and surroundings thereof to an anti-fouling action both at the position of the at least one active slab zone and at a position of the at least one passive slab zone. In view of the general light-emitting performance of commonly available light generators/sources such as ultraviolet LEDs, assuming the practical option of the at least one passive slab zone extending along at least a part of the periphery of the carrier slab 40, it is safe to have a width of the at least one passive slab zone between the at least one active slab zone and the periphery of the carrier slab 40 that is smaller than or equal to 10 cm or probably 9 cm.

As mentioned in the foregoing, in the anti-fouling unit 1 according to the first practical embodiment of the invention, the carrier slab 40 has a square periphery. Further, the anti-fouling unit 1 comprises a single electric circuit 30. In FIG. 1, light sources 32 included in the light-emitting arrangement 31 of the electric circuit 30 are diagrammatically depicted as rectangles. The electric circuit 30 also comprises a power-receiving arrangement 33 that is configured to receive power from outside of the anti-fouling unit 1 to be used for powering the light-emitting arrangement 31. The power-receiving arrangement 33 comprises two electric coils 34, which are diagrammatically indicated in FIG. 1 as ovals.

In the case of an electric circuit 30 of an anti-fouling unit according to the invention comprising a power-receiving arrangement 33 and the power-receiving arrangement 33 relying on the power-receiving functionality of electric coils, the number of electric coils 34 in the power-receiving arrangement 33 may be one or more. When the power-receiving arrangement 33 comprises at least two electric coils 34, it may be so that the at least two electric coils 34 are configured to function independently from each other, so that power supply to the electric circuit 30 can be realized through either one of the electric coils 34, which allows for an enhanced degree of freedom in positioning the anti-fouling unit on the surface 20 assuming that power can only be picked up at certain predetermined positions on the surface 20, which is the case when power-supplying strips 21 or the like are present on the surface 20. An example of a power-supplying strip 21 is diagrammatically shown in FIG. 5, wherein it is to be noted that it may be practical if the power-supplying strip 21 comprises a plurality of electric coils 22 arranged in a row.

In the anti-fouling unit 1 according to the first practical embodiment of the invention, the carrier slab 40 includes one active slab zone 42 and two passive slab zones 43, wherein the passive slab zones 43 extend at opposite sides of the active slab zone 42. Delimitations between the active slab zone 42 and the respective passive slab zones 43 are indicated through dash-and-dot lines in FIG. 1.

The anti-fouling unit 4 according to the fourth practical embodiment of the invention as diagrammatically shown in FIG. 5 is an example of an anti-fouling unit comprising two or even more electric circuits 30 including at least one light-emitting arrangement 31, and a passive slab zone 43 extending between an active slab zone 42 where the one electric circuit 30 is located and an active slab zone 42 where the at least one other electric circuit 30 is located. In particular, the anti-fouling unit 4 according to the fourth practical embodiment of the invention comprises as much as three electric circuits 30 including at least one light-emitting arrangement 31, wherein the different active slab zones 42 where a first and a second of the electric circuits 30 are located, respectively, are separated by a passive slab zone 43, and wherein the different active slab zones 42 where the second and a third of the electric circuits 30 are located, respectively, are separated by another passive slab zone 43. The different active slab zones 42 may be of any size, wherein it is noted that it may be practical if each of the active slab zones 42 has another size, as is the case in the shown example, so that a large variety of appearances of separate pieces as may be created on the basis of the anti-fouling unit 4 can be obtained. For the sake of completeness, it is noted that the anti-fouling unit 4 can be divided in two or three separate pieces by performing a cutting action or the like at the position of one or both of the passive slab zones 43.

Figure 7:
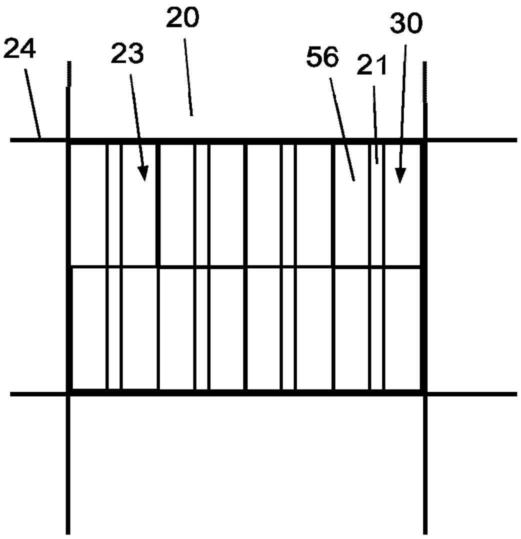

FIGS. 6 and 7 illustrate how a number of anti-fouling units 5 according to the fifth practical embodiment of the invention can be used for covering a surface portion 23 that is located between welding seams 24 on the surface 20. In FIG. 6, it is shown how the anti-fouling units 5 would need to be arranged on the surface portion 23 if it would not be possible to divide the anti-fouling units 5 in separate pieces without deteriorating the light-emitting functionality of the anti-fouling units 5. It can be seen that this is not an optimal arrangement, wherein the pieces of two anti-fouling units 5 shown on the right are dimensioned so as to make the whole arrangement fit on the surface portion 23 at the cost of no longer being operable to fulfill an anti-fouling function. In FIG. 6, it is also indicated how according to the invention the anti-fouling units 5 can be provided with peripheral passive slab zones 43 at two opposite sides of a central active slab zone 42, and in FIG. 7, it is shown how a number of pieces 56 of the anti-fouling units 5 obtained after dividing the anti-fouling units 51 in pieces and including the central active slab zone 42 of the anti-fouling units 5 can be used to cover the surface portion 23. Each of the pieces 56 is effective in performing the anti-fouling function as desired. Further, a possible arrangement of power-supplying strips 21 on the surface portion 23 is illustrated in FIG. 7, wherein each power-supplying strip 21 extends behind the pieces 56 at a central position relative to the pieces 56, which is effective when it is assumed that the electric circuit 30 included in the pieces 56 includes a power-receiving arrangement such as an electric coil at a more or less central position.

FIG. 8 illustrates two different ways in which the anti-fouling unit 6 according to the sixth practical embodiment of the invention can be positioned relative to a power-supplying strip 21. As mentioned earlier, the periphery of the carrier slab 40 of the anti-fouling unit 6 according to the sixth practical embodiment of the invention is of rectangular shape. In order to allow for both an option of arranging the anti-fouling unit 6 with its long axis extending in the direction in which the power-supplying strip 21 extends, as shown at the left side of FIG. 8, and an option of arranging the anti-fouling unit 6 with its short axis extending in the direction in which the power-supplying strip 21 extends, as shown at the right side of FIG. 8, it is advantageous that the power-receiving arrangement 33 comprises an electric coil 34 that is centrally arranged in the carrier slab 40. In particular, as shown, the electric coil 34 may be ring-shaped, wherein the center of gravity of the carrier slab 40 is in an area surrounded by the electric coil 34. As an alternative, equipping the anti-fouling unit 6 with at least two electric coils 34 is feasible, with one electric coil 34 being arranged so as to extend along a short side of the carrier slab 40 and another electric coil 34 being arranged so as to extend along a long side of the carrier slab 40.

Figure 9:
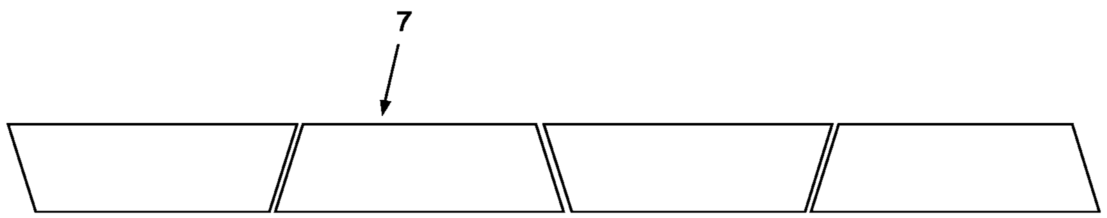
FIG. 9 illustrates a possibility in respect of a pattern of anti-fouling units according to a seventh practical embodiment of the invention.

FIG. 9 illustrates how anti-fouling units 7 according to the seventh practical embodiment of the invention can be arranged in a row. As mentioned earlier, the periphery of the carrier slab 40 of the anti-fouling unit 7 according to the seventh practical embodiment of the invention is of trapezoidal shape. A characteristic of the trapezoidal shape of the carrier slab 40 is that the anti-fouling units 7 can be arranged in a straight row by alternately rotating the anti-fouling unit 7 on the surface 20 by 180°, assuming the symmetrical trapezoidal shape as shown. On the basis of the trapezoidal shape of the carrier slab 40, the anti-fouling units 7 are further very well suitable to be used for covering convexly curved surfaces 20, as already suggested with reference to FIGS. 2 and 3, or concavely curved surfaces 20. Thus, the anti-fouling unit comprising a carrier slab 40 having a trapezoidal periphery can be widely used, all the more since the carrier slab 40 can be cut to size so as to account for different radii of curvature of the surfaces 20.

Figure 10:
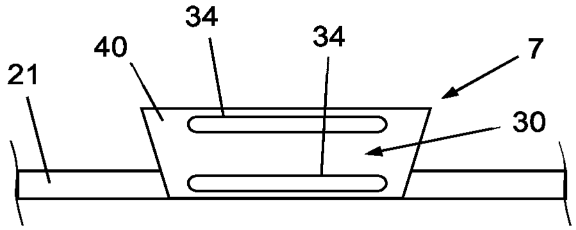
FIG. 10 illustrates how an anti-fouling unit according to the seventh practical embodiment of the invention can be positioned relative to a power-supplying strip, FIG. 11 diagrammatically shows an anti-fouling unit according to an eighth practical embodiment of the invention, FIG. 12 diagrammatically shows an anti-fouling unit according to a ninth practical embodiment of the invention, FIG. 13 diagrammatically shows an anti-fouling unit according to a tenth practical embodiment of the invention, FIG. 14 diagrammatically shows an anti-fouling unit according to an eleventh practical embodiment of the invention, FIG. 15 diagrammatically shows an anti-fouling unit according to a twelfth practical embodiment of the invention.

FIG. 10 illustrates that the anti-fouling unit 7 according to the seventh practical embodiment of the invention may be equipped with two independent power-receiving electric coils 34 in a single electric circuit 30, and that one of the coils 34 can be arranged along the basis of the trapezoidal shape of the carrier slab 40 of the anti-fouling unit 7, while the other of the coils 34 can be arranged along the top of the trapezoidal shape. In this way, it is achieved that the anti-fouling unit 7 can be positioned in two different ways relative to a power-supplying strip 21 and still be operable in the exact same manner.

Figure 11:
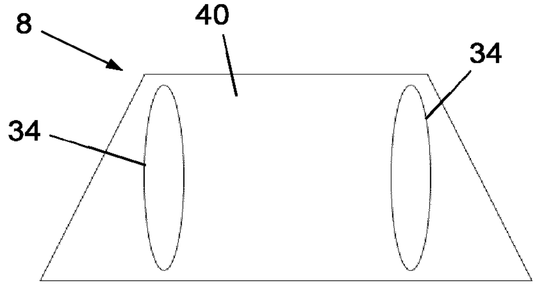
Figure 12:
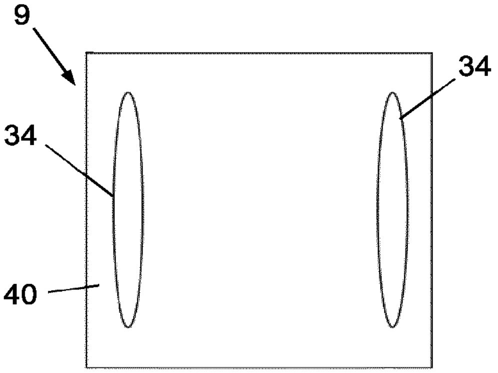
Figure 13:
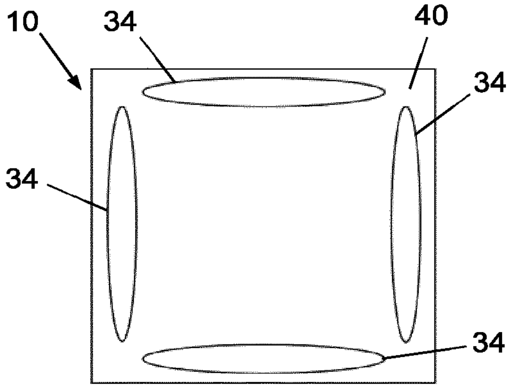
Figure 14:
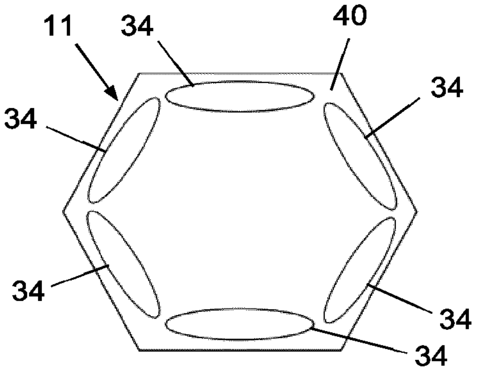
Figure 15:
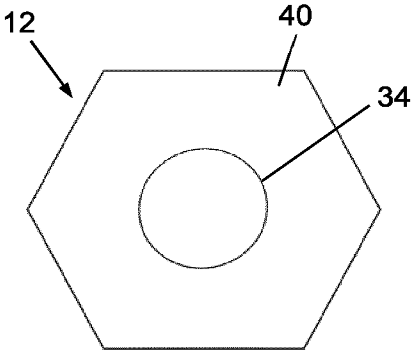

FIGS. 11, 12, 13, 14 and 15 serve to illustrate different options in respect of the peripheral shape of the carrier slab 40 of the anti-fouling unit and the number and positioning of power-receiving electric coils 34 in the anti-fouling unit. FIG. 11 illustrates the option of the shape of the carrier slab 40 being trapezoidal, the number of power-receiving electric coils 34 being two, and the positioning of the power-receiving electric coils 34 being near each of the slanted sides of the trapezoidal shape, aligned with the axis of mirror symmetry of the trapezoidal shape, whereby the positioning of the power-receiving electric coils 34 is different from what is shown in FIG. 10. FIG. 12 illustrates the option of the shape of the carrier slab 40 being square, the number of power-receiving electric coils 34 being two, and the positioning of the power-receiving electric coils 34 being at two opposite sides of the square shape. FIG. 13 illustrates the option of the shape of the carrier slab 40 being square, the number of power-receiving electric coils 34 being four, and the positioning of the power-receiving electric coils 34 being at each of the sides of the square shape so that there is an enhanced degree of freedom in arranging the anti-fouling unit 10 relative to one or two power-supplying strips 21. FIG. 14 illustrates the option of the shape of the carrier slab 40 being hexagonal, the number of power-receiving electric coils 34 being six, and the positioning of the power-receiving electric coils 34 being at each of the sides of the hexagonal shape. FIG. 15 illustrates the option of the shape of the carrier slab 40 being hexagonal, the number of power-receiving electric coils 34 being one, and the power-receiving electric coil 34 being located at a central position in the carrier slab 40.

In the framework of the invention, numerous other options than the ones referred to in the foregoing are feasible. For example, it may be practical to have a triangular shape or a parallelepipedal shape of the carrier slab 40, wherein it may further be practical to have power-receiving electric coils 34 at each of the sides of the carrier slab 40 or to have a single, centrally arranged power-receiving coil 34.

Figure 16:
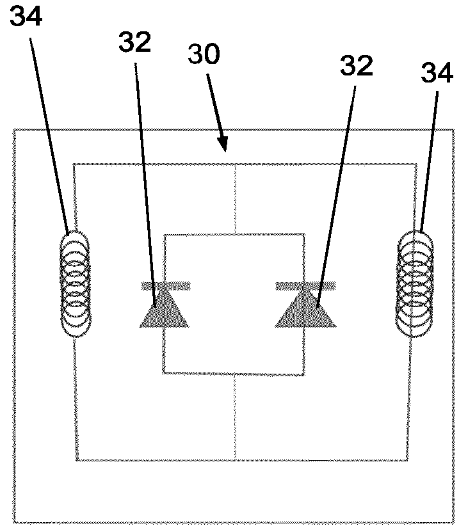
FIGS. 16 and 17 illustrate practical options in respect of the configuration of an electric circuit of an anti-fouling unit, FIG. 18 diagrammatically shows a side view of a carrier slab of an anti-fouling unit.
Figure 17:
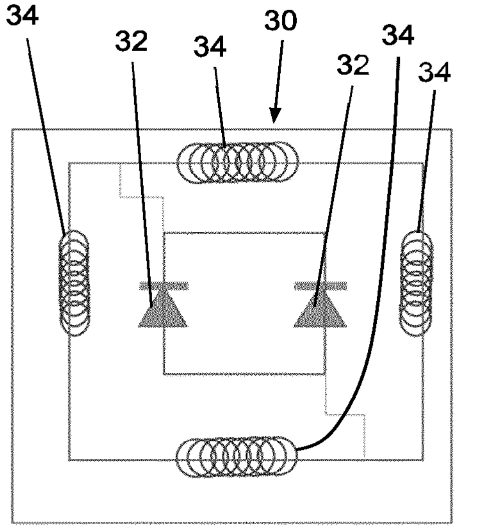

FIG. 16 illustrates a first practical option in respect of the configuration of an electric circuit 30, wherein the electric circuit 30 shown includes two light sources 32 being LEDs and two power-receiving electric coils 34. FIG. 17 illustrates a second practical option in respect of the configuration of an electric circuit 30, wherein the electric circuit 30 shown includes two light sources 32 being LEDs and four power-receiving electric coils 34.

It follows from the foregoing description of practical examples of anti-fouling units according to the invention that the invention provides an anti-fouling unit that can be divided in two or more separate pieces at the position of a passive slab zone 43, so that at least one piece can be obtained that can be fitted to a surface portion 23, and that can also still be operable to perform the anti-fouling function through emitting light assuming that the at least one piece includes at least one active slab zone 42 of the carrier slab 40 of the anti-fouling unit. Thus, when it is intended to arrange a plurality of anti-fouling units according to the invention on a surface 20, the invention allows for tailoring at least a number of the anti-fouling units in accordance with specifics of a surface portion 23 to be occupied by dividing the anti-fouling units in two or more separate pieces over one or more passive slab zones 43.

Figure 18:
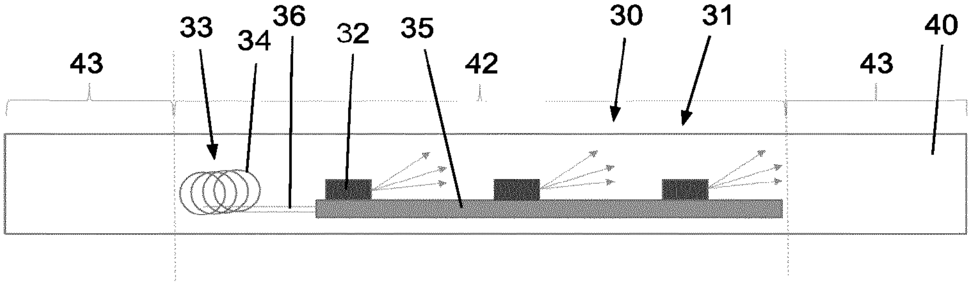

Basic aspects of the invention are further illustrated in FIGS. 18, 19, 20 and 21. FIG. 18 diagrammatically shows a side view of a carrier slab 40 of an anti-fouling unit. In the figure, a central active slab zone 42 and two passive slab zones 43 can be seen, the passive slab zones 43 being located at the periphery of the carrier slab 40, at opposite sides of the active slab zone 42. At the position of the active slab zone 42, an electric circuit 30 including a light-emitting arrangement 31 and a power-receiving arrangement 33 is present in the carrier slab 40. In the shown example, the electric circuit 30 comprises a number of UV-C LEDs 32 arranged on a printed circuit board 35, a power-receiving electric coil 34 located at a side of the printed circuit board 35, and electric wiring 36 interconnecting the electric coil 34 and the printed circuit board 35. Emission of UV-C light by the UVC-LEDs is diagrammatically indicated by means of arrows.

Figure 19:
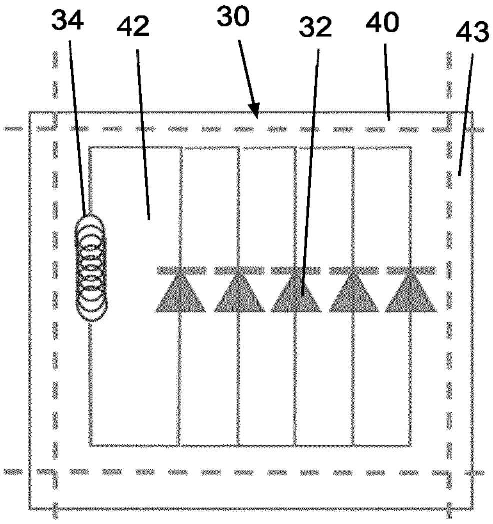
FIGS. 19, 20 and 21 illustrate how an anti-fouling unit can be divided in separate pieces.
Figure 20:
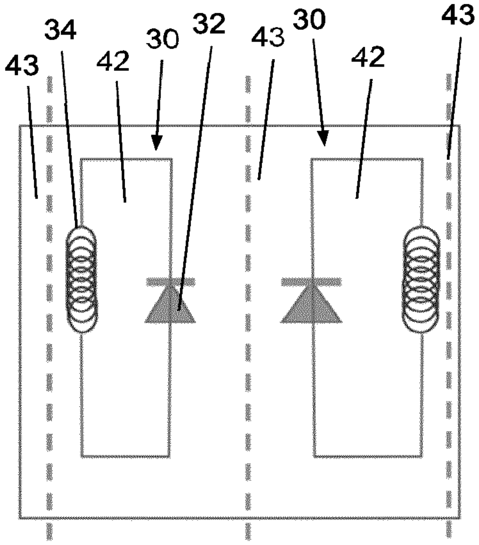
Figure 21:
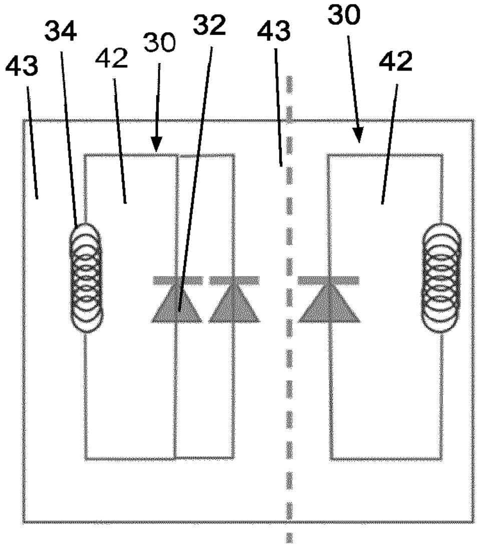

FIGS. 19, 20 and 21 illustrate different configurations of the electric circuit 30 as may be embedded in the material of a carrier slab 40. In each of the figures, some of the possible cutting lines are shown, in the form of dashed lines. FIG. 19 relates to a case in which a single electric circuit 30 is present at a central position, and in which one or more peripheral pieces can be cut off along the periphery of the carrier slab 40, i.e. a case in which a central active slab zone 42 is surrounded by peripheral passive slab zones 43 and in which the respective anti-fouling unit can be divided in a larger piece including the electric circuit 30 and at least one smaller peripheral piece, wherein the latter may be strip-shaped. FIG. 20 relates to a case in which two similar electric circuits 30 are present and in which it is not only possible to make cuts near the periphery, but also at the position of a passive slab zone 43 extending between the active slab zones 42 where the electric circuits 30 are located. FIG. 21 relates to a case in which two different electric circuits 30 are present and in which it is also possible to make cuts at the position of a passive slab zone 43 extending between the active slab zones 42 where the electric circuits 30 are located.

For the sake of clarity, it is to be noted that each of FIGS. 16, 17, 19, 20 and 21 may seem to show something like a wiring scheme, however, in no way should that what is shown be interpreted so as to represent an actual, complete wiring scheme. Likewise, it is to be noted that the representation of FIG. 18 is of a diagrammatical character only.

Figure 22:
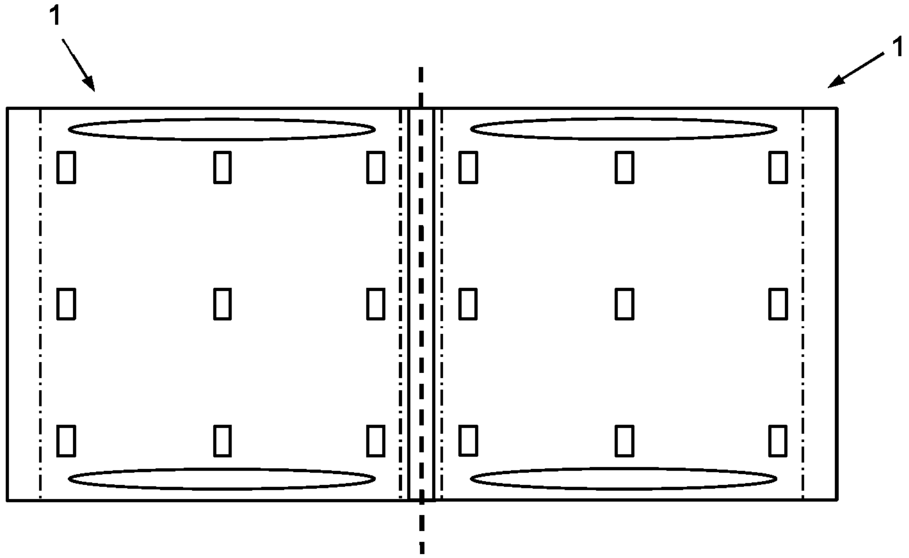
FIG. 22 illustrates how two anti-fouling units can be cut to realize a closely adjoining arrangement of edges of the anti-fouling units.

FIG. 22 illustrates how two anti-fouling units can be cut to realize a closely adjoining arrangement of edges of the anti-fouling units. As an example, two anti-fouling units 1 according to the first practical embodiment of the invention are shown in the figure. In order to prepare the anti-fouling units 1 for cutting, the anti-fouling units 1 are positioned relative to each other with passive slab zones 43 of the anti-fouling units 1 in an overlapping arrangement, as can be seen in the figure. In the figure, a possible cutting line is depicted in the form of a dashed line. It is readily understood from the figure that once a cut has been made through the overlapping passive slab zones 43 of the anti-fouling units 1 along the cutting line, it is realized that both anti-fouling units 1 are provided with complementary edges in one go so that a closely adjoining arrangement of the edges of the anti-fouling units 1 is immediately realized.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

In the context of the examples described in the foregoing with reference to the figures, it is suggested that the anti-fouling units may be provided with one or more electric coils 34 for the purpose of receiving power from an external power-supplying arrangement, which may also comprise electric coils 22. This does not alter the fact that the invention covers other ways of supplying and receiving power and use of their associated components as well.

Notable aspects of the invention are summarized as follows. An anti-fouling unit is configured to be arranged on a surface 20 and comprises at least one electric circuit 30 including a light-emitting arrangement 31 configured to emit anti-fouling light. Further, the anti-fouling unit comprises a plate-shaped carrier slab 40 carrying the at least one electric circuit 30. The carrier slab 40 includes at least one active slab zone 42 where the at least one electric circuit 30 is located and at least one passive slab zone 43 outside the active slab zone 42, which at least one passive slab zone 43 is configured to allow a division of the anti-fouling unit in separate pieces without deteriorating the anti-fouling functionality, and the light-emitting arrangement 31 of the at least one electric circuit 30 is configured to realize the anti-fouling functionality both at a position of the at least one active slab zone 42 and at a position of the at least one passive slab zone 43.

When it is intended to cover a surface 20 on which irregularities such as welding seams 24 are present with a plurality of anti-fouling units, the invention offers a possibility of arranging the anti-fouling units alongside the irregularities without a need of at least partially overlapping with the irregularities. The fact is that the anti-fouling units which are to be located near the irregularities can be cut to size so as to fit on a surface portion 23 alongside the irregularities, wherein the cuts can be made in passive slab zones 43 of the anti-fouling units so that the anti-fouling units may still be capable of performing their anti-fouling functionality.

The invention claimed is:

1. An anti-fouling unit configured to be arranged on a surface, wherein the anti-fouling unit comprises at least one electric circuit including a light-emitting arrangement configured to emit anti-fouling light, and a plate-shaped carrier slab carrying the at least one electric circuit, the carrier slab has an emission surface configured to allow light from the light-emitting arrangement of the at least one electric circuit to pass to outside of the anti-fouling unit and to thereby subject an exterior side of the emission surface and surroundings thereof to an anti-fouling action, the carrier slab includes at least one active slab zone where the at least one electric circuit is located and at least one passive slab zone outside the active slab zone, which at least one passive slab zone is configured to allow a division of the anti-fouling unit in separate pieces in order to fit on a predetermined surface portion while keeping the functionality of the at least one electric circuit intact, and the light-emitting arrangement of the at least one electric circuit is configured to subject the exterior side of the emission surface and surroundings thereof to an anti-fouling action both at a position of the at least one active slab zone and at a position of the at least one passive slab zone.

2. The anti-fouling unit according to claim 1, wherein the at least one passive slab zone extends along at least a part of the periphery of the carrier slab.

3. The anti-fouling unit according to claim 1, comprising two electric circuits including at least one light-emitting arrangement, and a passive slab zone extending between an active slab zone where the one electric circuit is located and another active slab zone where the other electric circuit is located.

4. The anti-fouling unit according to claim 1, wherein a ratio of the size of the at least one passive slab zone in the emission surface the size of the at least one active slab zone in the emission surface is in a range of 0.1 to 10.

5. The anti-fouling unit according to claim 1, wherein the at least one electric circuit further includes a power-receiving arrangement configured to receive power from outside of the anti-fouling unit to be used for powering the light-emitting arrangement, and wherein the power-receiving arrangement comprises at least two electric coils configured to function independently from each other.

6. The anti-fouling unit according to claim 1, comprising a single electric circuit, wherein the single electric circuit further includes a power-receiving arrangement configured to receive power from outside of the anti-fouling unit to be used for powering the light-emitting arrangement, and wherein the power-receiving arrangement comprises an electric coil that is centrally arranged in the carrier slab.

7. The anti-fouling unit according to claim 1, wherein the at least one electric circuit is embedded in the material of the carrier slab.

8. An assembly of an object and a plurality of anti-fouling units according to claim 1 arranged on a surface of the object.

9. A method of preparing an anti-fouling unit according to claim 1 for at least partial arrangement thereof on a surface, wherein the anti-fouling unit is divided in separate pieces at the position of at least one passive slab zone while keeping the functionality of the at least one electric circuit intact.

10. The method of claim 9, wherein a shape of one of the separate pieces of the anti-fouling unit is realized in compliance with a surface portion of predetermined outline and associated space on the surface to be occupied by the one of the separate pieces.

11. The method of claim 9, wherein the anti-fouling unit is subjected to a cutting action at the position of the at least one passive slab zone.

12. The method of applying a plurality of anti-fouling units according to claim 1 to a surface, wherein the anti-fouling units are arranged on the surface in a plane filling pattern, and wherein at least a number of the anti-fouling units is divided in separate pieces at the position of at least one passive slab zone while keeping the functionality of the at least one electric circuit intact.

13. The method of claim 12, wherein the anti-fouling units are positioned on the surface alongside each other in a closely adjoining fashion.

14. The method of claim 12, wherein a shape of one of the separate pieces of each of the anti-fouling units which are divided in separate pieces is realized in compliance with a surface portion of predetermined outline and associated space on the surface to be occupied by the one of the separate pieces.

15. The method of claim 12, wherein dividing at least a number of the anti-fouling units in separate pieces involves actions of positioning two of the anti-fouling units relative to each other with passive slab zones of the respective anti-fouling units in an overlapping arrangement and making a single cut through the overlapping passive slab zones.

* * * * *